United States Patent
Freiter et al.

(10) Patent No.: US 9,639,341 B2
(45) Date of Patent: May 2, 2017

(54) NETWORK HARDWARE AND SOFTWARE UPGRADE RECOMMENDER

(75) Inventors: Gregory Freiter, Dunstable, MA (US); Hasmik Sarkezians, Lexington, MA (US); Kumar Adarsh, Nashua, NH (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 13/587,873

(22) Filed: Aug. 16, 2012

(65) Prior Publication Data

US 2014/0053146 A1 Feb. 20, 2014

(51) Int. Cl.
- *G06F 11/22* (2006.01)
- *G06F 9/445* (2006.01)
- *G06Q 30/06* (2012.01)

(52) U.S. Cl.
CPC ............ *G06F 8/65* (2013.01); *G06Q 30/0631* (2013.01)

(58) Field of Classification Search
CPC .............. G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | |
|---|---|---|---|
| 2003/0067378 A1* | 4/2003 | Baarman | B01D 35/143 337/241 |
| 2007/0033201 A1* | 2/2007 | Stienhans | G06F 8/71 |
| 2008/0133211 A1* | 6/2008 | Dombrowski et al. | 703/22 |
| 2009/0100110 A1* | 4/2009 | Holtom | G06F 17/30067 |
| 2011/0029966 A1* | 2/2011 | Moshir | G06F 8/62 717/173 |
| 2011/0083127 A1* | 4/2011 | Georgis | G06F 8/61 717/173 |
| 2012/0072903 A1* | 3/2012 | Joukov | G06F 8/63 717/175 |
| 2012/0311135 A1* | 12/2012 | DeLuca | G06F 9/44505 709/224 |

OTHER PUBLICATIONS

Paul Thurrott, Rafael Rivera, Windows 7 Secrets, Sep. 8, 2009, Wiley, 1st edition, pp. 91-95.*
Thurrott et al., Windows 7 secrets, 2009.*
Thurrott et al., Windows 7 Secrets, 2000.*
Westland, Scaling Up Output Capacity and Performance Results from Information Systems Prototypes, 1990.*

* cited by examiner

*Primary Examiner* — Craig Dorais
*Assistant Examiner* — Zhan Chen
(74) *Attorney, Agent, or Firm* — IP Spring (57) ABSTRACT

Methods, systems and computer readable media for generating hardware and software upgrade recommendations for a managed network of devices are described.

14 Claims, 5 Drawing Sheets

NETWORK HARDWARE AND SOFTWARE UPGRADE RECOMMENDER

TECHNICAL FIELD

Embodiments relate generally to computer networks, and more particularly, to methods, systems and computer readable media for generating network-wide hardware and software upgrade recommendations.

BACKGROUND

Some conventional network hardware upgrade systems may perform a capacity analysis and base a recommendation on that analysis (e.g., a capacity planning tool). Also, there are systems that automatically upgrade software (or recommend upgrades). However, some of these conventional systems may make recommendations based on limited criteria such as current software version being used compared to the current release version.

SUMMARY

Some embodiments can include a method for generating a software upgrade recommendation for a network of managed devices. The method can include receiving, using one or more computing devices, network environment information, hardware configuration information and software configuration information. The network environment information can be based on output from a network management system and represents information about the network of managed devices. The hardware configuration information and the software configuration information can be provided as device list data having software versions.

The method can also include accessing, at the one or more computing devices, product information. The method can further include generating a software upgrade recommendation for the network of managed devices, the recommendation being based on the network environment information, the hardware configuration information, the software configuration information and the product information.

The software upgrade recommendation can include a ranking (or rating) for each upgrade recommendation and supporting data for each ranking.

The method can also include determining a usage pattern of each device in the network of managed devices and basing the software upgrade recommendation on the usage pattern of each device. The method can further include automatically gathering software release data including versions available and release notes indicating software and hardware compatibilities.

The method can also include combining network environment information, hardware configuration information, software configuration information and release data to identify devices in the network of managed devices that can be upgraded to include new functionality. The method can include determining, based on usage information and software release data, that a device requires a software version previous to a current version.

One or more embodiments can include a method for generating hardware upgrade recommendations for a managed network. The method can include receiving, using one or more computing devices, network environment information, hardware configuration information and software configuration information. The network environment information can be based on output from a network management system and represents information about the managed network of devices.

The method can also include accessing, at the one or more computing devices, product information including software constraints on hardware. The method can further include generating a hardware upgrade recommendation for the devices in the managed network, the recommendation being based on the network environment information, the hardware configuration information, the software configuration information and the product information. The hardware upgrade recommendation can include a capacity of each device, changes needed in hardware to allow for a software upgrade, and hardware upgrades that simplify network infrastructure.

The method can also include determining a usage pattern of each device in the managed network and basing the hardware upgrade recommendation on the usage pattern of each device. The method can further include generating a list of devices nearing end of life or at end of life. The method can include combining network environment information, hardware configuration information and software configuration information to identify devices in the network of managed devices that can be upgraded to include new functionality.

The method can also include generating a software upgrade recommendation for the managed network. Generating the software upgrade recommendation can include generating a software upgrade recommendation for the network of managed devices, the recommendation being based on the network environment information, the hardware configuration information, the software configuration information and the product information.

One or more embodiments can include a system for automatically generating hardware and software upgrade recommendations for a managed network. The system can have a processor, and a data storage device coupled to the processor, the data storage device can have software instructions stored thereon that, when executed by the processor, cause the processor to perform operations including receiving network environment information, hardware configuration information and software configuration information, wherein the network environment information is based on output from a network management system and represents information about the managed network of devices.

The operations can also include accessing product information including software constraints on hardware, and generating a hardware upgrade recommendation for the devices in the managed network, the recommendation being based on the network environment information, the hardware configuration information, the software configuration information and the product information. The operations can further include generating a software upgrade recommendation for the managed network. Generating the software upgrade recommendation can include generating a software upgrade recommendation for the network of managed devices, the recommendation being based on the network environment information, the hardware configuration information, the software configuration information and the product information.

The hardware upgrade recommendation can include a capacity of each device, changes needed in hardware to allow for a software upgrade, and hardware upgrades that simplify network infrastructure. The operations can also include determining a usage pattern of each device in the managed network and basing the software and/or hardware upgrade recommendations on the usage pattern of each device. The operations can further include generating a list of devices nearing end of life or at end of life.

The operations can include combining network environment information, hardware configuration information and software configuration information to identify devices in the network of managed devices that can be upgraded to include new functionality. The software upgrade recommendation can include a rating for each recommendation and supporting data for each rating.

The operations can also include determining a usage pattern of each device in the network of managed devices and basing the software and/or hardware upgrade recommendations on the usage pattern of each device. The operations can further include combining network environment information, hardware configuration information, software configuration information and release data to identify devices in the network of managed devices that can be upgraded to include new functionality.

DETAILED DESCRIPTION

Figure 1:
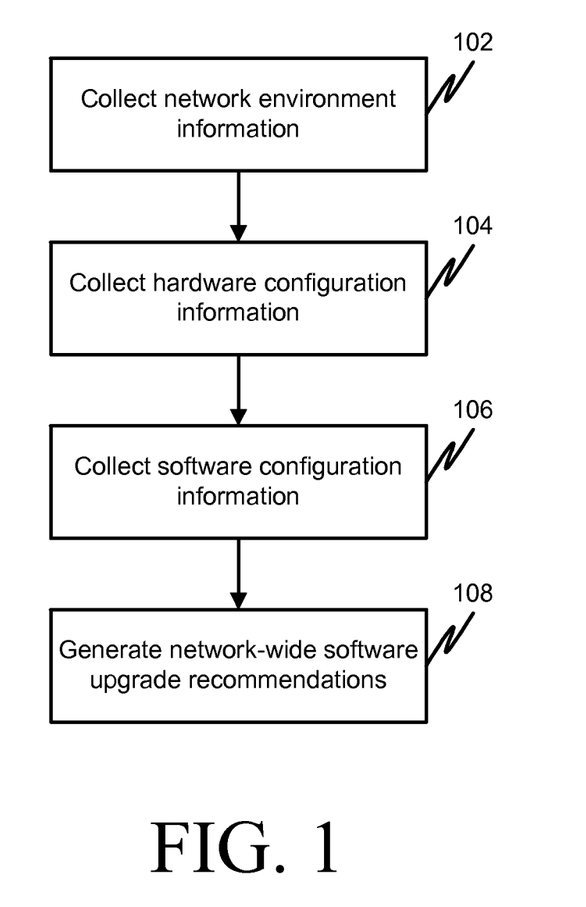
FIG. 1 is a flowchart of an example method for generating software upgrade recommendations in accordance with at least one embodiment.

FIG. 1 is a flowchart of an example method for generating software upgrade recommendations. Processing begins at 102, where network environment information is collected or received by a system. The network environment information can include data about a network of managed devices received from one or more network management systems (e.g., one or more of architecture, traffic quality and/or quantity, protocols, connections, devices and/or the like). Processing continues to 104.

At 104, the system collects (or receives) hardware configuration information. The hardware configuration information can include configuration information about each device in the managed network of devices. Processing continues to 106.

At 106, the system collects (or receives) software configuration information for each device in the managed network of devices. Processing continues to 108.

At 108, the system generates software upgrade recommendations for the entire managed network of devices. The upgrade recommendations are generated based on the network environment information, hardware configuration and software configuration of each device in the managed network.

Further, the system can include product information from one or more manufacturers in the process of generating upgrade recommendations. For example, product information can include the availability of a software upgrade for a particular device along with capability and compatibility information for that software upgrade. The system can use the product information to determine if an upgrade should be recommended for that device in the context of the managed network it is operating in.

Product information can be automatically and/or manually gathered from sources such as manufacturer websites. The product information can include software releases available and release notes for each software release. The release notes can indicate software/hardware compatibility issues and new (or repaired) functionality (e.g., a new protocol supported or an existing protocol with fixes made).

The system can bring together two sources of data—the present network information (including hardware and software configurations) and the software product upgrade information—to generate software upgrade recommendations. This can provide a customer or user of the managed network with an upgrade recommendation report for the entire network of managed devices that takes the entire network into consideration. The system can also provide a customer or user with information about new software functionality that might improve the managed network.

Figure 2:
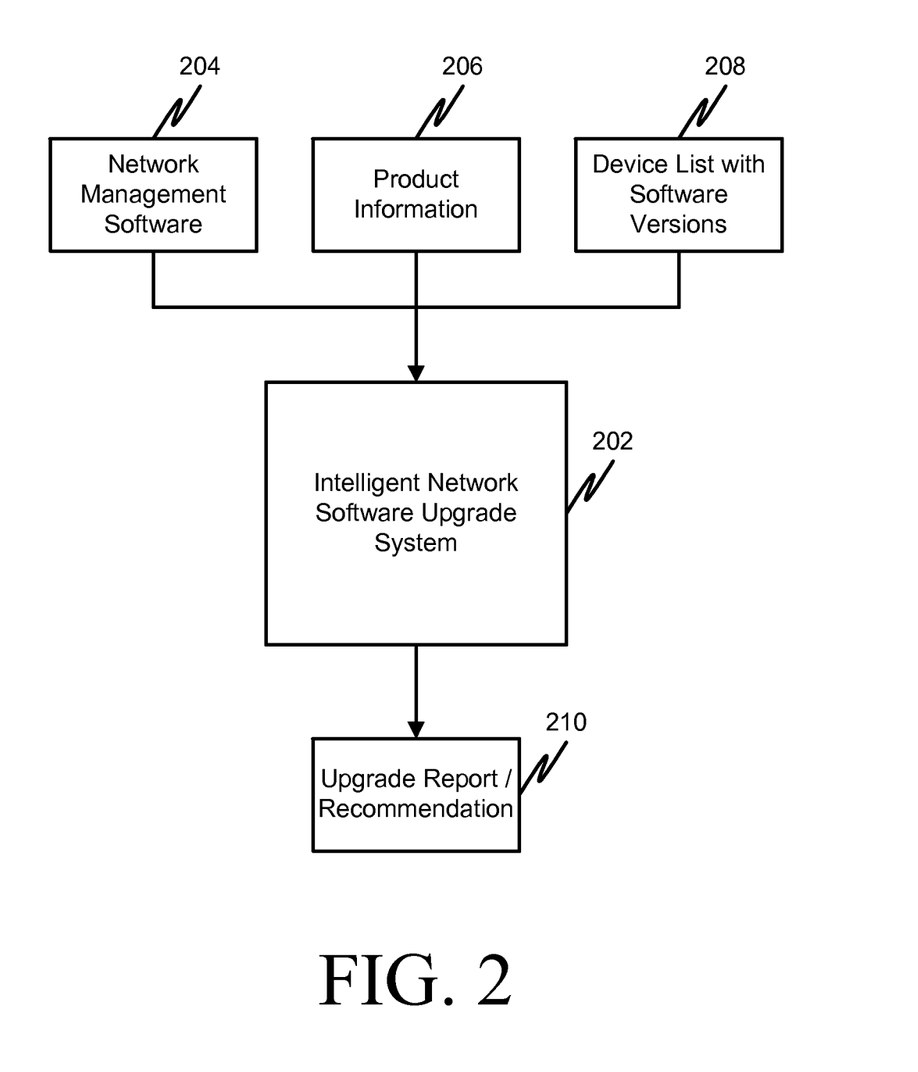
FIG. 2 is a diagram of an example system for generating software upgrade recommendations in accordance with at least one embodiment.

FIG. 2 is a diagram of an example system for generating software upgrade recommendations. The system can include an intelligent network software upgrade system 202. The system 202 can receive input, such as network environment information, from network management software 204. The system 202 can also receive product information 206 (as discussed above regarding 108 of FIG. 1) and a device list with software versions 208.

From the inputs (204-206) the system 202 can generate software upgrade recommendations (for example, using a process similar to that described above regarding FIG. 1). The recommendations can be provided as output 210 in the form of an electronic data file, a printed report, a report on a display device or as an electronic message sent to another system or device.

Figure 3:
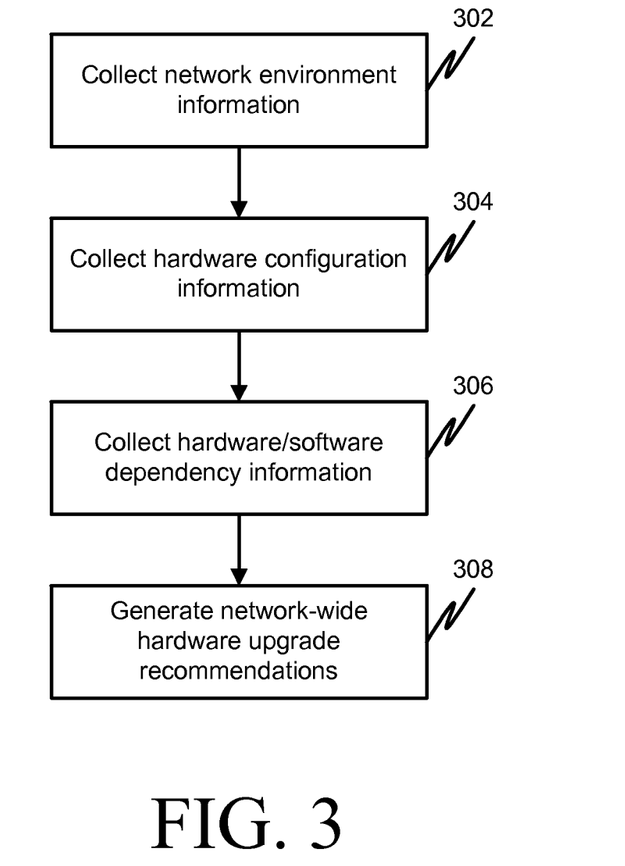
FIG. 3 is a flowchart of an example method for generating hardware upgrade recommendations in accordance with at least one embodiment.

FIG. 3 is a flowchart of an example method for generating hardware upgrade recommendations. Processing begins at 302.

At 302, a system collects or receives network environment information. The network environment information can include data about a network of managed devices received from one or more network management systems (e.g., one or more of architecture, traffic quality and/or quantity, protocols, connections, devices and/or the like). Processing continues to 304.

At 304, the system collects (or receives) hardware configuration information. The hardware configuration information can include configuration information about each device in the managed network of devices. Processing continues to 306.

At 306, the system collects (or receives) hardware/software dependency information including relationships between particular hardware devices and software (e.g., applications, protocols or the like). Processing continues to 308.

At 308, the system generates hardware upgrade recommendations for the devices in the managed network. The recommendations can include an overall view of the active capacity of each device in the managed network. Further, the recommendations can include hardware upgrade options that may improve the network and/or permit the network to expand. For example, a recommendation can include an indication of a device without any unused ports and a recommendation of an upgrade to a product that is compatible with the device and which can be inserted into a slot in the device to expand the capacity by providing unused ports.

The recommendations can also include an assessment of the impact of software upgrades on the existing hardware infrastructure. This aspect of the recommendations can use a representation of knowledge of the hardware as it relates to software capabilities. For example, a hardware card may need to be upgraded because the latest software version requires upgraded hardware. The recommendations can include changes needed in hardware/firmware in order to accommodate software upgrades.

The recommendations can also include recommendations of new technologies that can simplify an existing network infrastructure. For example, the system may analyze the network and determine that several existing devices can be collapsed into one new device having a larger capacity than the existing devices.

The system can also present an analysis of devices and locate devices that are nearing or at end of life and recommend upgrade possibilities for those devices.

Figure 4:
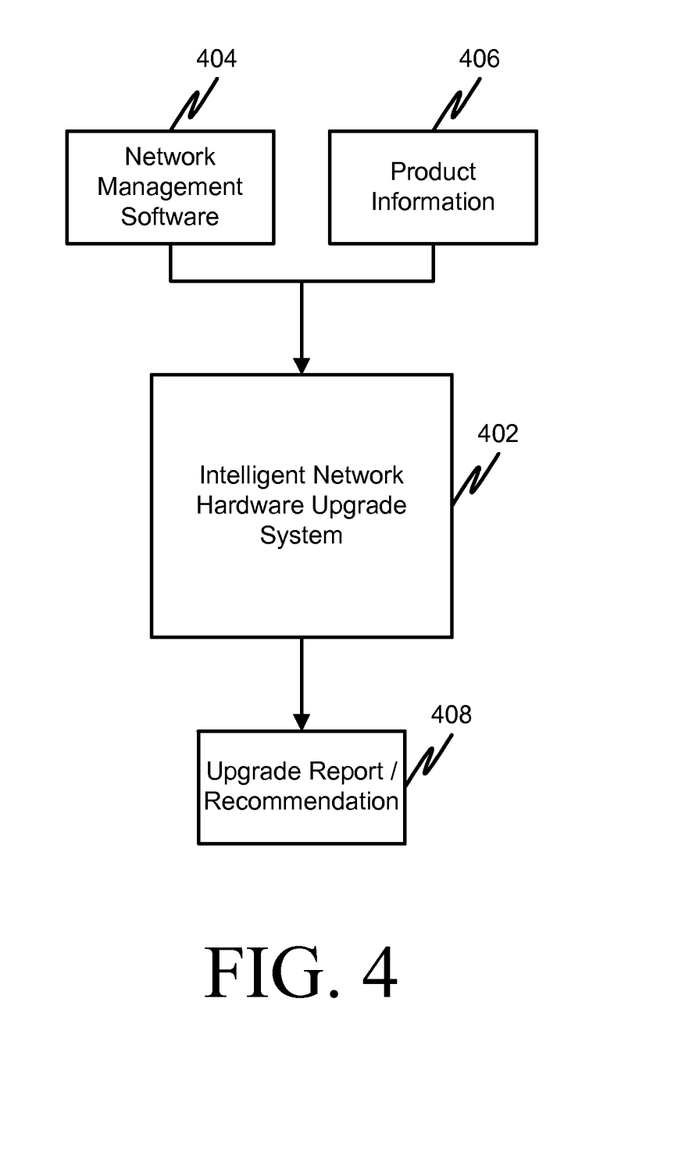
FIG. 4 is a diagram of an example system for generating hardware upgrade recommendations in accordance with at least one embodiment.

FIG. 4 is a diagram of an example system for generating hardware upgrade recommendations. The system can include an intelligent network hardware upgrade system 402. The system 402 can receive input, such as network environment information, from network management software 404. The system 402 can also receive product information 406 (e.g., new products available and their respective capabilities and capacities).

From the inputs (404-406) the system 402 can generate software upgrade recommendations (for example, using a process similar to that described above regarding FIG. 3). The recommendations can be provided as output 408 in the form of an electronic data file, a printed report, a report on a display device or as an electronic message sent to another system or device.

Figure 5:
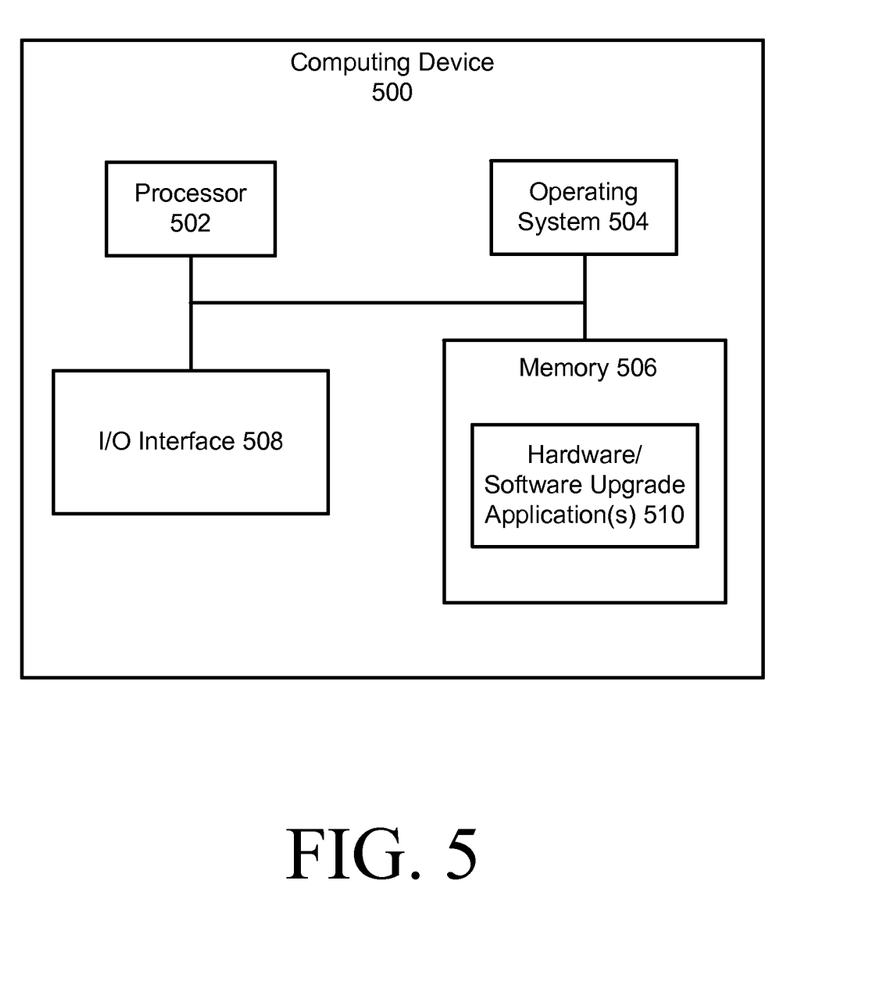
FIG. 5 is a diagram of an example computer system for generating software and hardware upgrade recommendations in accordance with at least one embodiment.

FIG. 5 is a diagram of an example server device 500 that can be used for generating hardware and/or software upgrade recommendations in accordance with at least one embodiment. The server device 500 includes a processor 502, operating system 504, memory 506 and I/O interface 508. The memory 506 can include a managed network hardware and/or software upgrade application 510.

In operation, the processor 502 may execute the application 510 stored in the memory 506. The application 510 can include software instructions that, when executed by the processor, cause the processor to perform hardware and/or software upgrade recommendations in accordance with the present disclosure (e.g., performing one or more of steps 102-108 and/or 302-308 described above). The application program 510 can operate in conjunction with the operating system 504.

The server (e.g., 500) can include, but is not limited to, a single processor system, a multi-processor system (co-located or distributed), a cloud computing system, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It will be appreciated that the modules, processes, systems, and sections described above can be implemented in hardware, hardware programmed by software, software instructions stored on a nontransitory computer readable medium or a combination of the above. A system for generating hardware and/or software upgrade recommendations for a managed network of devices, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for generating hardware and software upgrade recommendations for a managed network of devices.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method for generating hardware upgrade recommendations for a managed network of devices, the method comprising:
   receiving, using one or more computing devices, network environment information, hardware configuration information and software configuration information, wherein the network environment information includes data about the network of managed devices received from one or more network management systems and wherein the data includes network architecture data including hardware devices in the network of managed devices and network connections between those hardware devices;
   collecting, at the one or more computing devices, hardware/software dependency information including relationships between hardware devices and software including one or more of applications and protocols;
   accessing, at the one or more computing devices, product information including software constraints on hardware; and
   generating, using the one or more computing devices, a hardware upgrade recommendation for the devices in the managed network, the recommendation being based on the network environment information, the hardware configuration information, the software configuration information, the hardware/software dependency information, and the product information, wherein generating the hardware recommendation includes one of determining that a plurality of existing devices can be collapsed into one new device having a larger capacity than the plurality of existing devices and determining that a device does not have any unused ports and providing a recommendation of an upgrade to a product that is compatible with the device without any unused ports and which can be inserted into a slot in the device to expand the capacity by providing unused ports.

2. The method of claim 1, wherein the hardware upgrade recommendation includes a capacity of each device, an indication of any changes needed in hardware to allow for a software upgrade, and hardware upgrades that simplify network infrastructure.

3. The method of claim 1, further comprising determining a usage pattern of each device in the managed network and basing the hardware upgrade recommendation on the usage pattern of each device.

4. The method of claim 1, further comprising generating a list of devices nearing end of life or at end of life.

5. The method of claim 1, further comprising combining network environment information, hardware configuration information and software configuration information to identify devices in the network of managed devices that can be upgraded to include new functionality.

6. The method of claim 1, further comprising generating a software upgrade recommendation for the managed network, wherein generating the software upgrade recommendation includes:
   generating a software upgrade recommendation for the network of managed devices, the recommendation being based on the network environment information, the hardware configuration information, the software configuration information and the product information.

7. A system for automatically generating hardware and software upgrade recommendations for a managed network of devices, the system comprising:
   a processor; and
   a data storage device coupled to the processor, the data storage device having stored thereon software instruction that, when executed by the processor, cause the processor to perform operations including:
      receiving network environment information, hardware configuration information and software configuration information, wherein the network environment information includes data about the network of managed devices received from one or more network management systems and wherein the data includes network architecture data including hardware devices in the network of managed devices and network connections between those hardware devices;
      collecting, at the one or more computing devices, hardware/software dependency information including relationships between hardware devices and software including one or more of applications and protocols;
      accessing product information including software constraints on hardware and industry best practice information;
      generating a hardware upgrade recommendation for the devices in the managed network, the recommendation being based on the network environment information, the hardware configuration information, the software configuration information, the hardware/software dependency information, and the product information; and
      generating a software upgrade recommendation for the devices in the managed network, wherein generating the software upgrade recommendation including generating a software upgrade recommendation for the network of managed devices, the recommendation being based on the network environment information, the hardware configuration information, the software configuration information and the product information, wherein generating the hardware recommendation includes one of determining that a plurality of existing devices can be collapsed into one new device having a larger capacity than the plurality of existing devices and determining that a device does not have any unused ports and providing a recommendation of an upgrade to a product that is compatible with the device without any unused ports and which can be inserted into a slot in the device to expand the capacity by providing unused ports.

8. The system of claim 7, wherein the hardware upgrade recommendation includes a capacity of each device, changes needed in hardware to allow for a software upgrade, and hardware upgrades that simplify network infrastructure.

9. The system of claim 7, wherein the operations further comprise determining a usage pattern of each device in the managed network and basing the software upgrade recommendation on the usage pattern of each device.

10. The system of claim 7, wherein the operations further comprise generating a list of devices nearing end of life or at end of life.

11. The system of claim 7, wherein the operations further comprise combining network environment information, hardware configuration information and software configuration information to identify devices in the network of managed devices that can be upgraded to include new functionality.

12. The system of claim 7, wherein the software upgrade recommendation includes a ranking for each recommendation and supporting data for each ranking.

13. The system of claim 7, wherein the operations further comprise:
    determining a usage pattern of each device in the network of managed devices and basing the software upgrade recommendation on the usage pattern of each device.

14. The system of claim 7, wherein the operations further comprise combining network environment information, hardware configuration information, software configuration information and release data for all of the devices in the managed network to identify devices in the network of managed devices that can be upgraded to include new functionality.

* * * * *